United States Patent [19]
Park et al.

[11] Patent Number: 6,057,999
[45] Date of Patent: May 2, 2000

[54] DEVICE FOR PREVENTING GENERATION OF X-RAY AND OVERVOLTAGE

[75] Inventors: Jeong Hoon Park; Yeo Sung Yun, both of Kyungsangbuk-do, Rep. of Korea

[73] Assignee: LG Electronics, Inc., Seoul, Rep. of Korea

[21] Appl. No.: 09/192,307

[22] Filed: Nov. 16, 1998

[30] Foreign Application Priority Data

Nov. 19, 1997 [KR] Rep. of Korea ........................ 97-61000

[51] Int. Cl.[7] ...................................................... H02H 3/00
[52] U.S. Cl. ............................ 361/91.1; 361/56; 361/111; 361/115; 361/118
[58] Field of Search ............................ 361/91.1, 56, 111, 361/118, 115, 18

[56] References Cited

U.S. PATENT DOCUMENTS 5,148,088 9/1992 Jernigan ................................... 315/411

*Primary Examiner*—Stephen W. Jackson
*Attorney, Agent, or Firm*—Fleshner & Kim, LLP

[57] ABSTRACT

Device for preventing generation of X-ray and overvoltage, in which abnormal voltages at voltage output terminals are detected to control a power supply part and a horizontal deflection outputting part directly, for assuring a stability of a power supply, reducing a power consumption, and prevent burning of peripheral circuits due to the abnormal high voltage in advance, the device including a power supply part for dropping an AC power supply voltage to provide as DC power supply voltages, a high voltage generating part for providing a high voltage in response to an external horizontal deflection pulse, an X-ray detecting part for detecting an X-ray signal as the high voltage from the high voltage generating part rises, an over voltage detecting part for detecting an over voltage from each of a plurality of power supply voltages from the power supply part, a first, and a second comparing parts each for providing a preset power supply voltage when a voltage detected by the X-ray detecting part or the over voltage detecting part is over a preset voltage, and a power supply cut-off part for cutting off voltage supply from the power supply part by operating a thryster according to the voltages from the first, and second comparing parts.

10 Claims, 5 Drawing Sheets

DEVICE FOR PREVENTING GENERATION OF X-RAY AND OVERVOLTAGE

BACKGROUND OF THE INVENTION

1. Field of the Invention

The present invention relates to a protection device in a color display tube(CDT), and more particularly, to a device for preventing generation of X-ray and overvoltage, in which an over voltage or a heater voltage caused by an abnormal operation of a monitor applied to a CDT, or an over voltage from a power source applied to peripheral circuit is detected and cut-off, for preventing generation of an X-ray and over voltage.

2. Background of the Related Art

Being one of cathode ray tube, though the CDT provides high resolution and luminance by accelerating thermion by means of a high voltage and exciting a fluorescent film, in general, the CDT generates much X-ray which is harmful to human body. The FDA(Food and Drug Administration) regulates a radiation exposure rate caused by a TV receiver such that the rate should not exceed 0.5 milliroentgen per hour at any point 5 cm away from an external surface of the receiver. Accordingly, a device for preventing generation of an X-ray is employed in the monitor circuit for satisfying the FDA regulation.

FIG. 1 illustrates a block diagram showing a related art device for preventing generation of an X-ray in a CDT.

Referring to FIG. 1, the related art device for preventing generation of an X-ray in a CDT is provided with a power supply part 1 for converting an AC voltage to a DC voltage and supplying different voltages $B^+$ and $B^{2+}$ required by different parts, a flyback transformer 2 for boosting a supply voltage $B^{2+}$ from the power supply part 1 according to a horizontal deflection pulse from a horizontal deflection outputting part 5 to provide a voltage required for a regular operation of a CDT 3 as well as a heater voltage H/V to an anode, a CDT 3 for emitting electron beams inclusive of an X-ray by means of the heater voltage H/V from the flyback transformer 2, an X-ray detecting part 4 for detecting an X-ray emitted from the CDT 3 and applying to the horizontal deflection outputting part 5, and the horizontal deflection outputting part 5 operative on the supply voltage $B^+$ from the power supply part 1 for providing different horizontal deflection pulses according to an intensity of the X-ray from the X-ray detecting part 4 for controlling operation of the flyback transformer 3. In the aforementioned related art device for preventing generation of an X-ray, the high voltages required for operating the CDT 3 are fixed according to sizes of the CDTs and manufacturer's specifications. If the high voltage is within a limitation, a safety of the CDT 3 is secured and the X-ray radiation therefrom gives no harm to a human body, if the high voltage exceeds the limitation, not only the safety of the CDT 3 can not be assured, but also the X-ray radiation may give a fatal harm to the human body because the X-ray radiation increases proportional to the intensity of the high voltage. In order to prevent this, when the power supply part 1 converts an AC voltage into a DC voltage and supplies driving voltages for driving different peripheral circuits, the horizontal deflection outputting part 5 provides different deflection pulses according to the driving voltage B+ from the power supply part 1 and the intensity of the X-ray from the X-ray detecting part 4 to control the flyback transformer 2, thereby preventing radiation of X-rays around the CDT 3. According to this, the flyback transformer 2 boosts the supply voltage $B^{2+}$ from the power supply part 1 according to an wound ratio to supply different stable voltages, such as the high voltage, a luminous voltage, a focus regulating voltage, and a heater voltage L/V to the CDT 3. In this instance, the X-ray detecting part 4 detects an X-ray from the high voltage H/V applied from the flyback transformer 2 to the anode terminal on the CDT 3. That is, the X-ray detecting part 4 detects a change of the high voltage H/V applied to the CDT 3 which rises in proportion to a rise of a high voltage caused by characteristics changes of circuit components, and, if the voltage change is higher than a value preset for each product(or the high voltage is higher than a preset value), the voltage change is applied to the horizontal deflection outputting part 5. The horizontal deflection outputting part 5 then compares the X-ray signal from the X-ray detecting part 4 to a reference signal, to cut off generation of the horizontal deflection pulses when the X-ray signal exceeds the reference signal. In this instance, since the flyback transformer having no horizontal deflection pulse applied thereto is not operative, the CDT 3 is not operative, too. Thus, the related art device for preventing generation of an X-ray protects the CDT 3 and cuts off the radiation of the X-ray by detecting a rise of the high voltage H/V caused by an abnormal high voltage applied to the CDT 3 and regulating generation of the horizontal deflection pulse.

However, the related art device for preventing generation of an X-ray has a problem of much power consumption because entire peripheral circuits inclusive of the power supply part except the flyback transformer and the X-ray detecting part are operative regularly even if operation of the CDT is stopped by cutting off generation of the horizontal deflection pulses at detection of the X-ray caused by a rise of the heater voltage from the flyback transformer.

SUMMARY OF THE INVENTION

Accordingly, the present invention is directed to a device for preventing generation of X-ray and overvoltage that substantially obviates one or more of the problems due to limitations and disadvantages of the related art.

An object of the present invention is to provide a device for preventing generation of X-ray and overvoltage, which can assure a stability of a power supply device, reduce a power consumption, and prevent burning of peripheral circuits due to the abnormal high voltage in advance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for preventing generation of X-ray and overvoltage includes a power supply part for dropping an AC power supply voltage to provide as DC power supply voltages, a high voltage generating part for providing a high voltage in response to an external horizontal deflection pulse, an X-ray detecting part for detecting an X-ray signal as the high voltage from the high voltage generating part rises, an over voltage detecting part for detecting an over voltage from each of a plurality of power supply voltages from the power supply part, a first, and a second comparing parts each for providing a preset power supply voltage when a voltage detected by the X-ray detecting part or the over voltage detecting part is over a preset voltage, and a power supply cut-off part for cutting off voltage supply from the power supply part by operating a thryster according to the voltages from the first, and second comparing parts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
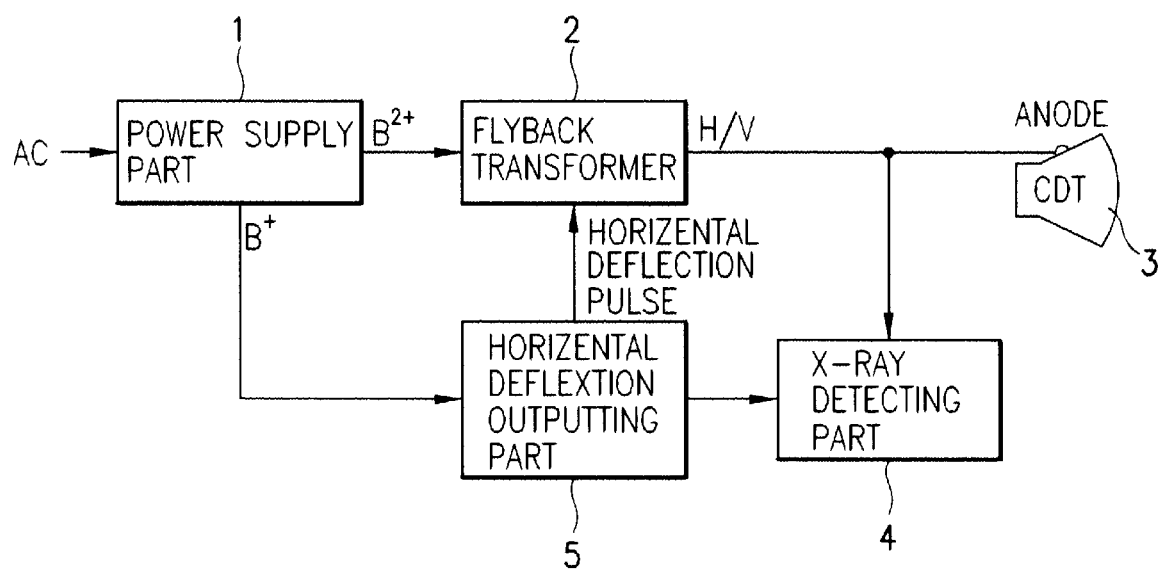
FIG. 1 illustrates a block diagram showing a related art device for preventing generation of an X-ray.
Figure 2:
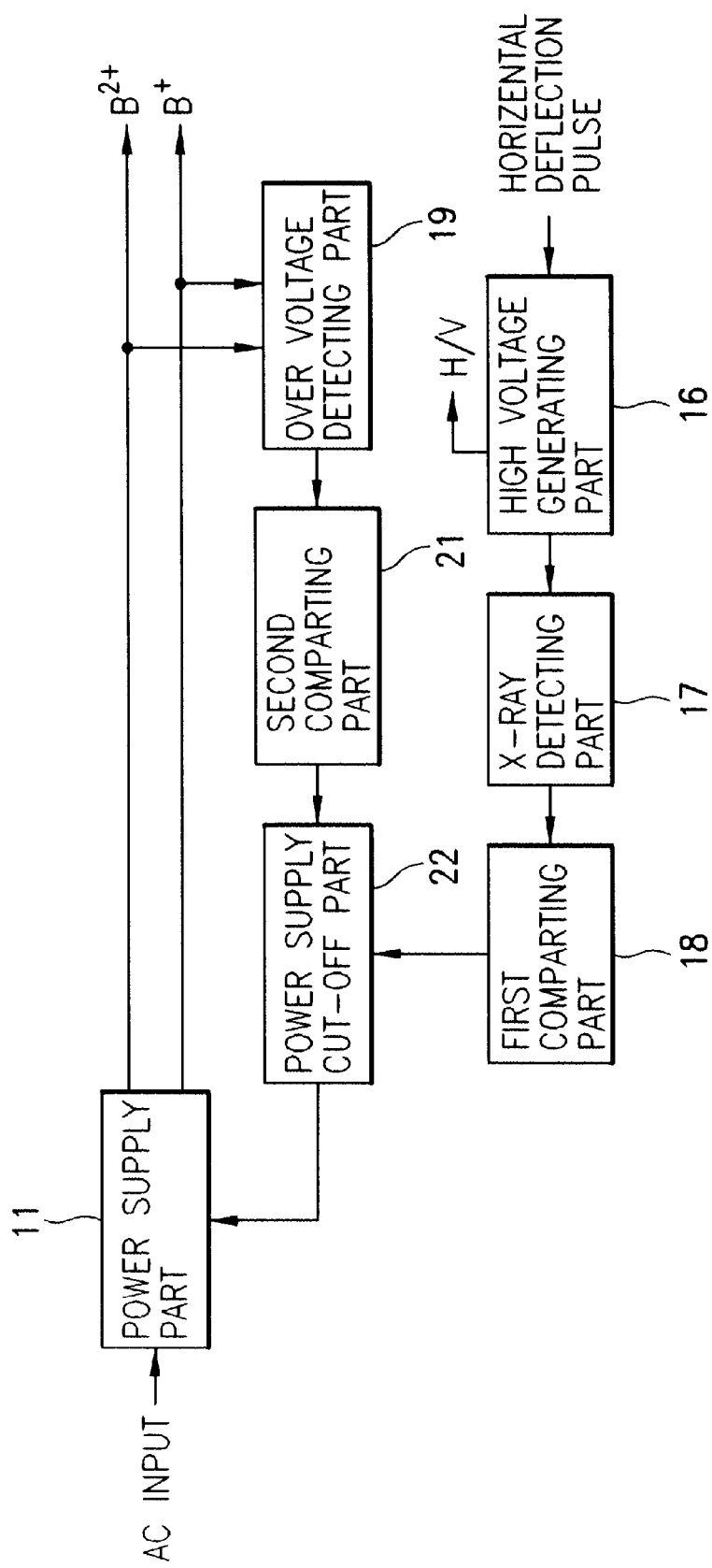
FIG. 2 illustrates a block diagram showing a device for preventing generation of an X-ray and an over voltage in accordance with a preferred embodiment of the present invention.
Figure 3:
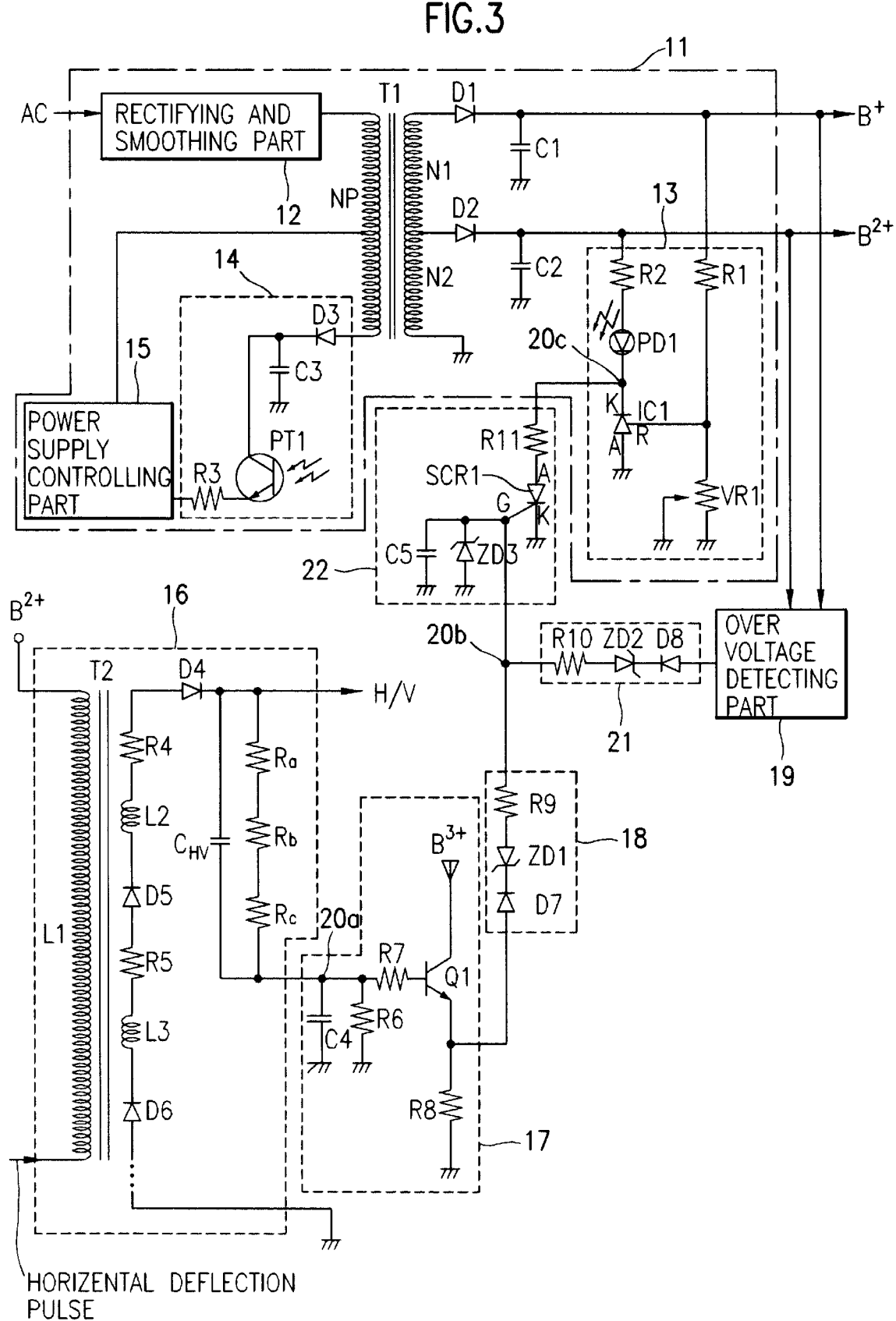
FIG. 3 illustrates a detail circuit of FIG. 2.

Reference will now be made in detail to the preferred embodiments of the present invention, examples of which are illustrated in the accompanying drawings. FIG. 2 illustrates a block diagram showing a device for preventing generation of an X-ray and an over voltage in accordance with a preferred embodiment of the present invention, and FIG. 3 illustrates a detail circuit of FIG. 2.

Referring to FIG. 2, the device for preventing generation of an X-ray and an over voltage in accordance with a preferred embodiment of the present invention includes a power supply part 11 for dropping an AC power supply voltage according to a wound ratio of a flyback transformer T1 and supplying to different parts, a high voltage generating part 16 for boosting a power supply voltage $B^{2+}$ from the power supply part 11 and supplying to an anode terminal in the CDT as a high voltage H/V, an X-ray detecting part 17 connected to one side of the high voltage generating part 16 for detecting a rise of the high voltage H/V, a first comparing part 18 for providing a power supply voltage $B^{3+}$ when a voltage detected by the X-ray detecting part 17 is over a preset voltage, an over voltage detecting part 19 for detecting an over voltage from the power supply part 11, a second comparing part 21 for providing a power supply voltage when the voltage detected by the over voltage detecting part 19 is over a preset voltage, a power supply cut-off part 22 for cutting off the power supply from the power supply part 11 according to the voltages from the first, and second comparing parts 18 and 21. The power supply part 11 includes a rectifying and smoothing part 12 for converting the AC power to a DC power and applying to a primary wound Np in a transformer T1, the transformer T1 for inducing the DC voltage from the rectifying and smoothing part 12 to voltages required for the peripheral circuits at secondary wounds N1 and N2 according to a wound ratio, diodes D1 and D2 and condensers C1 and C2 for rectifying voltages induced at the secondary wounds N1 and N2, a photo signal generating part 13 for supplying, a photo signal to a photo signal receiving part 14 when the rectified voltage is an over voltage, a photo signal receiving part 14 responsive to the photo signal from the photo signal generating part 13 to apply a bias voltage to a power supply controlling part 15, and the power supply controlling part 15 responsive to the photo signal from the photo signal generating part 13 for controlling operation of the transformer T1. The X-ray detecting part 17 includes a condenser C4 and a resistor R6 connected to resistors Ra~Rc and a capacitive condenser CHV in the high voltage generating part 16 in series for integrating the high voltage, and a transistor Q1 responsive to the integrated voltage for providing a power supply voltage $B^{3+}$ to an emitter. The first comparing part 18 includes a diode D7 for rectifying the power supply voltage $B^3+$ from the emitter in the transistor Q1 or preventing a reverse voltage, a zener diode ZD1 operative when a voltage rectified by the diode D7 is over a preset voltage, and a resistor R9 for restricting a current applied to a gate G on a thryster SCR1 by the zener diode ZD1. The second comparing part 21 includes a diode D8 for rectifying a voltage from the over voltage detecting part 19 or preventing a reverse voltage, a zener diode ZD2 operative when the voltage rectified by the diode D8 is over a preset voltage, and a resistor R10 for restricting a current applied to a gate G on a thryster SCR1 by the zener diode ZD2. The power supply cut-off part 22 includes a zener diode ZD3 and a condenser C3 for clipping a current applied from the first, and second comparing parts 18 and 21 to a preset level, a thryster SCR1 operative on the clipped current for increasing a current flowing through the photodiode PD1 in the photo signal generating part 13, and a resistor R11 connected to an anode on the thryster SCR1. The photo signal generating part 13 includes a resistor R1 and a variable resistor VR1 for dividing a power supply voltage $B^+$, a reference power supply IC IC1 operative on a voltage divided by the resistor R1 and the variable resistor VR1, and a photo diode PD1 for applying a photo signal to a photo transistor PT1 in the photo signal receiving part 14 in response to operation of the reference power supply IC IC1. The photo signal receiving part 14 includes a diode D3 and a condenser C3 for rectifying a voltage from the primary wound NP in the transformer T1, and a photo transistor PT1 for providing the voltage rectified through the diode D3 and a condenser C3 to the power supply controlling part 15 through the resistor R3. The unexplained reference numerals R2, R3~R5, R7, R8, and R11 are resistors, D4~D6 are diodes, C3 is a condenser, L1 is the primary wound, and L2 and L3 are the secondary wounds.

The operation of the device for prevention generation of X-ray and overvoltage in accordance with a preferred embodiment of the present invention will be explained, with reference to FIGS. 4A~4F.

Figure 4A:
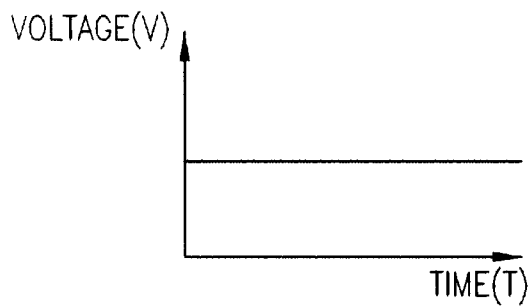
FIGS. 4A~4F illustrates waveforms at different nodes in FIG. 3.
Figure 4B:
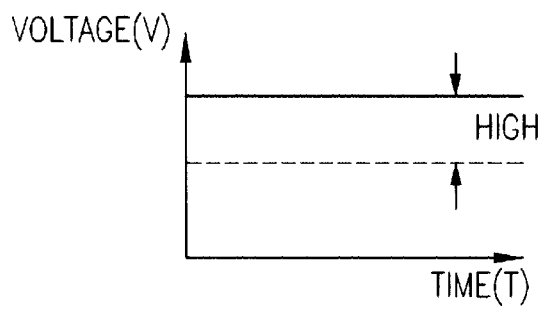
Figure 4C:
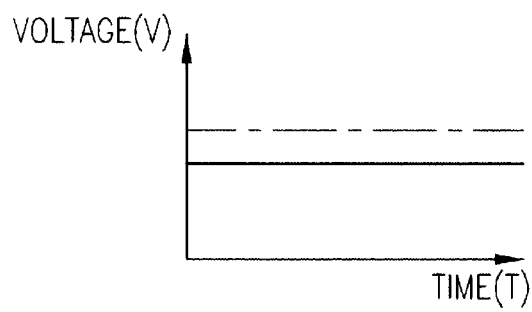
Figure 4D:
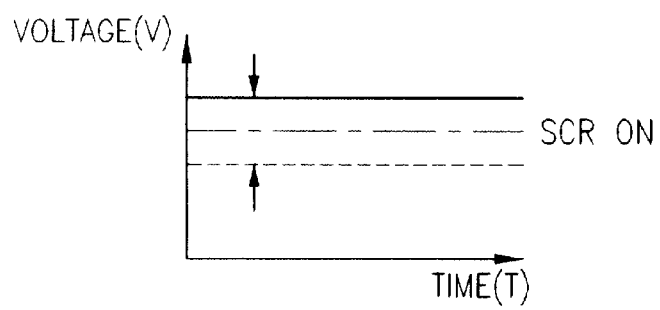
Figure 4E:
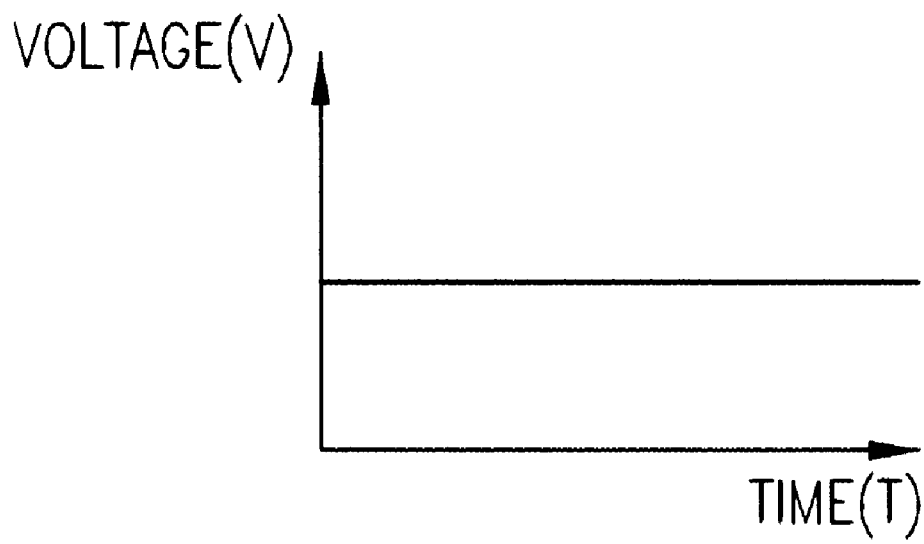
Figure 4F:
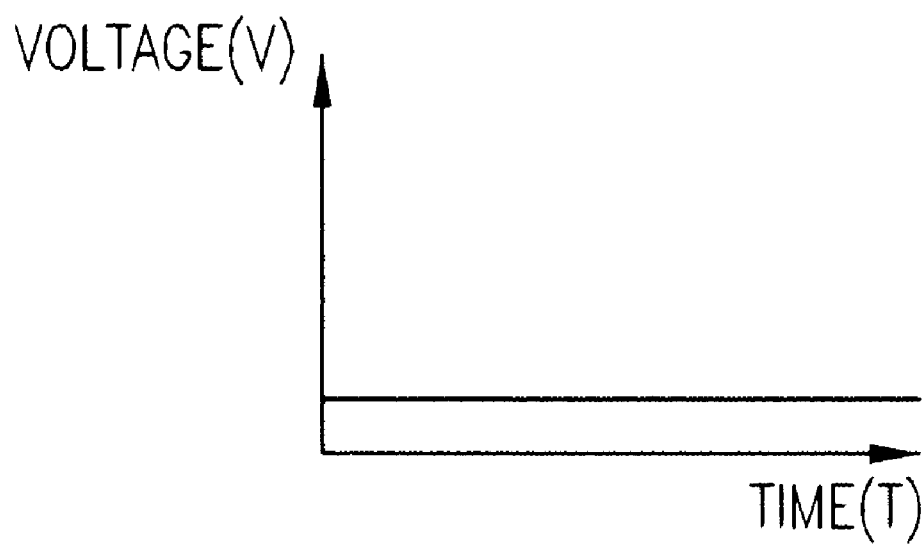

The power supply part 11 converts an AC power into a DC power through the rectifying and smoothing part 12 and applies to the primary wound NP in the transformer t1, to induce voltages required for peripheral circuits at the secondary wounds N1 and N2 according to a wound ratio between the primary wound NP and the secondary wounds N1 and N2 in the transformer T1. The voltages induced at the secondary wounds N1 and N2 in the transformer T1 is provided as rectified power supply voltages $B^+$ and $B^{2+}$, through the diodes D1 and D2 and the condensers C1 and C2, respectively. When the power supply voltages $B^+$ and $B^+$ are normal, the power supply voltage $B^+$ is divided by the resistor R1 and the variable resistor VR1 in the photo signal generating part 3 and applied to a reference R terminal on the reference power supply IC IC1. Then, since the reference power supply IC IC1 is responsive to a voltage applied to the reference terminal R, the power supply voltage $B^2$ flows to the anode A from a cathode K in the reference power supply IC IC1 through the photo diode PC1. In this instance, the photo diode PD1, applied of a high voltage as shown in FIG. 4E, is luminescent. Since photo signal by a current flowing through the photo diode PD1 is supplied to a base in the photo transistor PT1 in the photo signal receiving part 14, the photo transistor PT1 is turned on, to apply a driving voltage to the power supply controlling part 15. Accordingly, the power supply controlling part 15 controls a switching of the transformer T1 by means of a photo coupling between the photo signal generating part 13 and the photo signal receiving part 14, such that normal voltages flow through the secondary wounds N1 and N2 in the transformer T1. In this instance, as shown in FIG. 4F, since voltages detected from the X-ray detecting part 17 and the over voltage detecting part 19 is very low, the voltages from the first, and second comparing parts 17 and 21 are also very low unable to turn on the thryster SCR1 in the power supply cut-off part 22, thereby not conducting the operation of preventing generation of X-ray and overvoltage. In the meantime, the high voltage generating part 16 boosts the power supply voltage $B^{2+}$ applied to the primary wound L1 through the serially connected resistors R4 and R5, secondary wounds L2 and L3, diodes D5 and D6 in response to the horizontal deflection pulses from the horizontal deflection outputting part(not shown), to induce a high voltage H/V, which is supplied to the CDT(not shown). In this instance, the X-ray detecting part 17 detects a waveform as shown in FIG. 4A when the operation of the high voltage generating part 16 is normal, and detects a waveform as shown in FIG. 4B when the operation of the high voltage generating part 16 is not normal, When the operation of the high voltage generating part 16 is not normal, the X-ray detecting part 17 detects an abnormal voltage flowing through the serial resistors Ra~Rc and the capacitive condenser CHV. As an abnormal voltage, detected as an integrated form, is applied to the base of the transistor Q1 through the resistor R7, the transistor Q1 is turned on, boosting a voltage on the emitter terminal. The voltage from the transistor Q1 in the X-ray detecting part 17 is rectified through the diode D7 in the first comparing part 18, and applied to the zener diode ZD1. The zener diode ZD1, being conductive when the voltage detected by the X-ray detecting part 17 is above a preset voltage, turns on the thryster SCR1 in the power supply cut-off part 22. A current applied to the gate G on the thryster SCR1 is clipped by the condenser C5 and the zener diode ZD3 at a preset level, to turn on the SCR1. When a voltage with an waveform as shown in FIG. 4C is at a node 20b, the thryster SCR1 is turned off, and when a voltage with an waveform as shown in FIG. 4D is at a node 20b, the thryster SCR1 is turned on. Upon turning on of the thryster SCR1 in the power supply cut-off part 22, the power supply voltage $B^{2+}$ is caused to flow to the resistor R11 in the power supply cut-off part 22 through the photo diode PD1, and a current to the resistor R11 flows to ground terminal on the cathode K through anode A on the thryster SCR1. In this instance, since the voltage at the node 20c is dropped as shown in FIG. 4F, a current flowing through the photo diode PD1 in the photo signal generating part 13 increases, also increasing a current flowing through the base of the photo transistor PT1 in the photo signal receiving part 14, with a subsequent increase of a bias current applied to the power supply controlling part 15. Accordingly, the power supply controlling part 15 stops the switching operation that induces a preset voltage at the transformer T1. As the power supply controlling part 15 stops the switching operation, no voltages are induced at the secondary wounds N1 and N2 in the transformer T1, stopping supply of the power supply voltage $B^{2+}$ to the high voltage generating part 16, an X-ray emission from the CDT can be stopped. In the meantime, if the power supply voltages $B^+$ and $B^{2+}$ rise, the over voltage detecting part 19 detects these and applies to the second comparing part 21. The voltage applied to the second comparing part 21 is rectified through the diode D8, and makes the zener diode ZD2 conductive when the rectified voltage is above a preset voltage, causing to apply a driving voltage as shown in FIG. 4D to the gate G on the thryster SCR1 in the power supply cut-off part 22. When the voltage applied through the diode D8 is lower than the preset voltage(SCR on voltage) as shown in FIG. 4C, the thryster SCR1 is not turned on. As the thryster SCR1 is turned on at the voltage above the preset voltage from the second comparing part 21, the power supply voltage $B^{2+}$ flowing through the photo diode PD1 in the photo signal generating part 13 flows to the cathode K through the anode A on the thryster SCR1. In this instance, since the voltage at the node 20b is dropped(see FIG. 4F), to increase a bias current flowing through the photo diode PD1 in the photo signal generating part 13, a current to the base on the photo transistor PT1 in the photo signal receiving part 14 is also increased. As the bias current from the photo signal receiving part 14 turns on the photo transistor PT1, the driving voltage to the emitter rises, changing a duty ratio in the power supply controlling part 15. Accordingly, operation of the power supply controlling part 15 stops, inducing no voltages at the secondary wounds N1 and N2 in the transformer T1. Accordingly, as the power supply voltage $B^{2+}$ is not supplied to the primary wound L1 in the high voltage generating part 16, inducing no voltage at the secondary wounds L2 and L3, an X-ray generation in the CDT can be stopped. Thus, by detecting a voltage rise of the high voltage applied to the CDT with the X-ray detecting part 17 or the over voltage detecting part 19 when the high voltage rises, i.e., before the X-ray emission is started, stopping operation of the power supply part 11, and cutting off a power supply to the high voltage generating part 16 and the horizontal deflection outputting part, an X-ray emission from the CDT can be prevented in advance.

As has been explained, since abnormal voltages at the voltage output terminal and the high voltage supply terminal are detected by the X-ray detecting part and the over voltage detecting part to control the power supply part and the horizontal deflection outputting part directly, the device for preventing generation of X-ray and overvoltage of the present invention allows, not only the power supply part to supply a stable power, but also reduce a power consumption and burning of peripheral circuits due to overvoltage in advance.

And, the device for preventing generation of X-ray and overvoltage has a duplicative circuit protection function of the abnormal voltage detections at the power supply voltage output terminal and the high voltage supply terminal, and serves for a cost down as the device can dispense with an overvoltage protection circuit.

It will be apparent to those skilled in the art that various modifications and variations can be made in the device for preventing generation of X-ray and overvoltage of the present invention without departing from the spirit or scope of the invention. Thus, it is intended that the present invention cover the modifications and variations of this invention provided they come within the scope of the appended claims and their equivalents.

What is claimed is:

1. A device for preventing generation of an X-ray and an over voltage comprising:

a power supply circuit for dropping an AC power supply voltage to provide as DC power supply voltages, wherein the power supply circuit outputs a first power supply voltage and a second power supply voltage;

a high voltage generating circuit for providing a high voltage in response to a horizontal deflection pulse;

an X-ray detecting circuit for detecting an X-ray signal as the high voltage from the high voltage generating circuit rises;

an over voltage detecting circuit for detecting an over voltage based on the first power supply voltage and the second power supply voltage from the power supply circuit;

first and second comparing circuits, said first comparing circuit providing a first voltage when the X-ray signal detected by the X-ray detecting circuit is over a first preset voltage and said comparing circuit providing a second voltage when the over voltage detected by the over voltage detecting circuit is over a second preset voltage; and, a power supply cut-off circuit for cutting off the first and second power supply voltages from the power supply circuit by operating a thyristor according to the first and second voltages from the first and second comparing circuits, respectively.

2. The device as claimed in claim 1, wherein the power supply circuit includes;

a rectifying and smoothing circuit for converting an AC power to a DC power and applying to a primary wound in a transformer, the transformer for inducing a DC voltage from the rectifying and smoothing circuit to voltages required for peripheral circuits at secondary wounds according to wound ratios, a plurality of diodes and condensers for rectifying voltages induced at the secondary wounds, a photo signal generating circuit for supplying a photo signal to a photo signal receiving circuit when the rectified voltage is an over voltage, the photo signal receiving circuit responsive to the photo signal from the photo signal generating circuit to apply a bias voltage to a power supply controlling circuit, and the power supply controlling circuit responsive to the photo signal from the photo signal generating circuit for controlling operation of the transformer.

3. The device as claimed in claim 2, wherein the photo signal generating circuit includes;

a resistor and a variable resistor for dividing the power supply voltage, a reference power supply IC operative on the voltage divided by the resistor and the variable resistor, and a photo diode for applying the photo signal to the photo transistor in the photo signal receiving circuit according to operation of the reference power supply IC.

4. The device as claimed in claim 2, wherein the photo signal receiving circuit includes;

a diode and a condenser for rectifying a voltage from the primary wound in the transformer, and a photo transistor for providing the voltage rectified through the diode and a condenser to the power supply controlling circuit through the resistor.

5. The device as claimed in claim 1, wherein the power supply cut-off off circuit includes;

a zener diode and a condenser for clipping a current applied from the first comparing circuit to a preset level, the thyristor operative on the clipped current for increasing a current flowing through the photodiode in the photo signal generating circuit, and a resistor coupled to an anode on the thyristor.

6. A device for preventing generation of an X-ray comprising:

a power supply circuit for dropping an AC power supply voltage to provide as DC power supply voltages, wherein the power supply circuit outputs a first power supply voltage and a second power supply voltage;

a high voltage generating circuit receiving the second power supply voltage for providing a high voltage in response to a horizontal deflection pulse and the second power supply voltage;

an X-ray detecting circuit for detecting an X-ray signal as the high voltage from the high voltage generating circuit rises;

a first comparing circuit for providing a preset power supply voltage when the X-ray signal detected by the X-ray detecting circuit is over a preset voltage; and a power supply cut-off circuit for cutting off the first and second supply voltages from the power supply circuit by operating a thyristor according to the preset power supply voltage from the first comparing circuit.

7. The device as claimed in claim 6, wherein the X-ray detecting circuit includes;

a condenser and a resistor coupled to a plurality of resistors and a capacitive condenser in the high voltage generating circuit in series for integrating the heater voltage, and a transistor responsive to the integrated voltage for providing a power supply voltage to an emitter terminal.

8. The device as claimed in claim 6, wherein the first comparing circuit includes;

a diode for rectifying the power supply voltage from an emitter terminal in a transistor, a zener diode operative when a voltage rectified by the diode is over a preset voltage, and a resistor for restricting a current applied to a gate on the thyristor by the zener diode.

9. A device for preventing generation of an over voltage comprising:

a power supply circuit for dropping an AC power supply voltage to provide as DC power supply voltages, wherein the power supply circuit outputs a first power supply voltage and a second power supply voltage;

a high voltage generating circuit for providing a high voltage in response to a horizontal deflection pulse;

an over voltage detecting circuit for detecting an over voltage based on the first power supply voltage and the second power supply voltage from the power supply circuit;

a comparing circuit for providing a preset power supply voltage when the over voltage detected by the over voltage detecting circuit is over a preset voltage; and, a power supply cut-off circuit for cutting off the first and second power supply voltages from the power supply circuit by operating a thyristor according to the preset power supply voltage from the comparing circuit.

10. The device as claimed in claim 9, wherein the comparing circuit includes;

a diode for rectifying a voltage from the over voltage detecting circuit, a zener diode operative when the voltage rectified by the diode is over a preset voltage, and a resistor for restricting a current applied to a gate on the thyristor by the zener diode.

* * * * *